June 2, 1936. R. ERLING Re. 19,992

AUTOMATIC BY-PASS FOR HYDRAULIC MECHANISMS

Original Filed March 8, 1933 3 Sheets-Sheet 1

INVENTOR
RALPH ERLING,
BY
Robert U. Lamm
ATTORNEY

June 2, 1936. R. ERLING Re. 19,992

AUTOMATIC BY-PASS FOR HYDRAULIC MECHANISMS

Original Filed March 8, 1933 3 Sheets-Sheet 2

INVENTOR
RALPH ERLING.
BY
Robert A. Lavender
ATTORNEY

June 2, 1936. R. ERLING Re. 19,992

AUTOMATIC BY-PASS FOR HYDRAULIC MECHANISMS

Original Filed March 8, 1933 3 Sheets-Sheet 3

INVENTOR
RALPH ERLING.
BY
Robert A. Lawrence
ATTORNEY

Reissued June 2, 1936 Re. 19,992

UNITED STATES PATENT OFFICE 19,992

AUTOMATIC BY-PASS FOR HYDRAULIC MECHANISMS

Ralph Erling, Cranford, N. J.

Original No. 1,969,736 (act of 1883, as amended), dated August 14, 1934, Serial No. 660,071, March 8, 1933. Application for reissue January 8, 1936, Serial No. 58,237

17 Claims. (Cl. 60—52)

This invention relates to mechanism for controlling hydraulic power apparatus used for moving a ship's rudder to prevent injury thereto by the rudder yoke being moved against the hard over stops under power.

An object of this invention is to prevent the setting up of destructive stresses in the rudder mechanism when the rudder has reached the hard over position.

A further object is to prevent overloading of the steering gear motor by forcing the rudder against the hard over stops, which overloading would cause the motor circuit breakers to open and result in loss of steering control.

Figure 1:
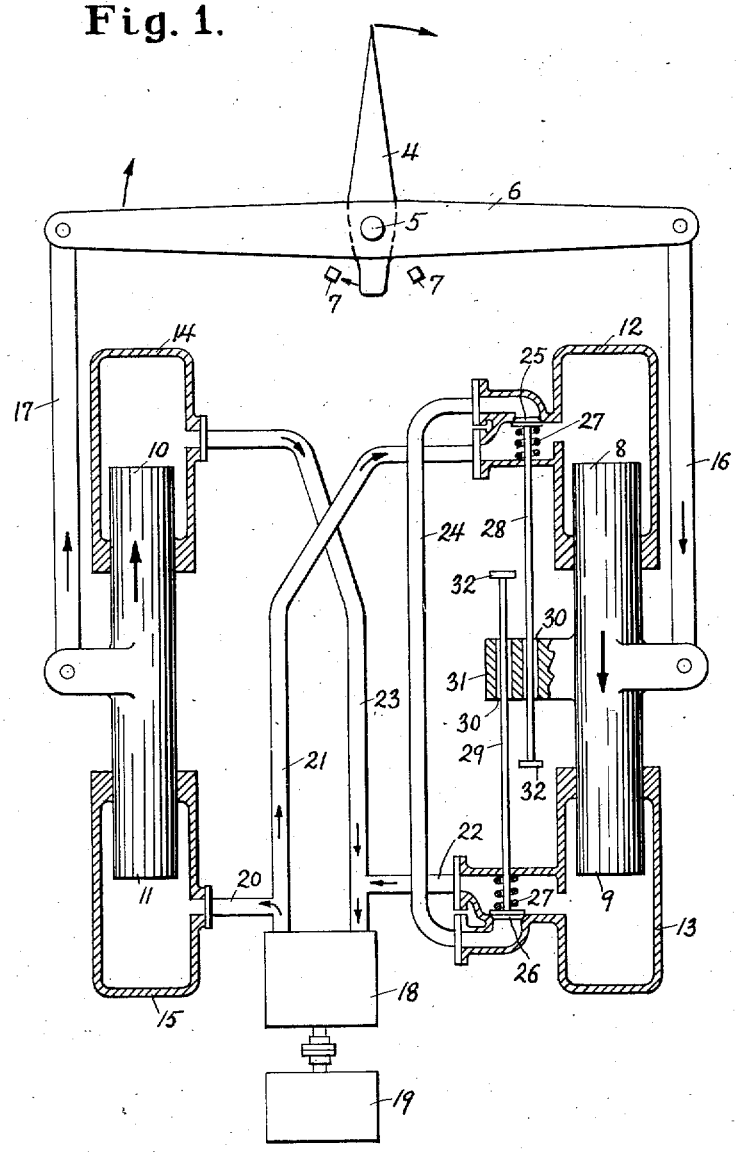
Fig. 1 is a schematic assembly view of one form of my invention in which are utilized four rams and cylinders with automatic by-pass control on the cylinders in which one pair of rams operates.

In Fig. 1 the rudder 4 is mounted on a rudder post 5 to which is connected a crosshead 6, the hard over stops 7 being provided to prevent movement of the rudder beyond the maximum rudder angle. The power mechanism for operating the rudder comprises rams 8, 9, 10 and 11 operable in cylinders 12, 13, 14 and 15, respectively. While the rams 8 and 9 and rams 11 and 10 may constitute a single member, yet for purposes of facility of description, they are designated as separate members connected together. Rams 8 and 9 are connected to one end of crosshead 6 by a link 16 and rams 10 and 11 are connected to the other end of the crosshead by a link 17.

The continuously operating variable delivery pump 18, driven by motor 19, supplies liquid under pressure to two of the cylinders and withdraws liquid from the other two cylinders. As shown in Fig. 1, wherein the arrows indicate direction of flow of the liquid and the consequent movement of the rams, the yoke and the rudder, the rams 11 and 8 are being acted upon by liquid under pressure discharge from pump 18, while the liquid is being returned to the pump from cylinders 13 and 14.

Cylinders 12 and 13 are connected together by a pipe 24, at the ends of which are disposed valves 25 and 26 that are loaded by means of springs 27. Each of these valves is adapted to be pressed against its seat by positive pressure in the cylinder adjacent thereto but will be unseated by liquid under pressure in pipe 24. Stems 28 and 29 are connected to valves 25 and 26 respectively and extend through apertures 30 in a lug 31 carried by rams 8 and 9, there being a head 32 secured to the outer end of each of said stems.

The operation of the device is as follows: The liquid under pressure passes from pump 18 through pipes 20 and 21 to cylinders 15 and 12, respectively, moving the rams in the direction indicated by the arrows and turning rudder 4 in the clockwise sense. Shortly before the rudder reaches hard over stop 7, the lug 31 contacts head 32 on valve stem 28 and opens valve 25, thereby permitting the liquid under pressure to flow from cylinder 12 through pipe 24 to valve 26 which is unseated thereby and so permits the liquid to flow into cylinder 13, thus equalizing the pressures upon the rams 8 and 9. Also, since cylinder 14 is connected to cylinder 13 by pipes 22 and 23, the pressures in cylinders 14 and 15 will be equalized. It is obvious that this equalization of pressures in all the cylinders will check the movement of the rams and stop the rudder before it is forced against stops 7. To swing rudder 4 in the opposite direction to that indicated in Fig. 1, the direction of operation of pump 18 would be changed to discharge through pipes 22 and 23 to cylinders 13 and 14 and to return the liquid from cylinders 12 and 15 to the pump, in which case the lug 31 would open valve 26 to equalize the pressures in the several cylinders.

If the rudder is swung in the direction indicated by the arrow in Fig. 1 when the ship is going astern the liquid is forced into cylinders 12 and 15 through pipes 21 and 20, respectively, but at relatively small pressure since the rams are being moved in the direction of the arrows by water pressure on the rudder and the liquid in cylinders 13 and 14 is under greater pressure that is that in cylinders 12 and 15. As the rams move, the lug 31 contacts the head 32 on stem 28 which unseats valve 25 and permits the liquid to flow through pipe 24 to valve 26 which, however, is not unseated due to the pressure in cylinder 13 being greater than that in cylinder 12. The liquid in cylinders 13 and 14 acts as a cushion and permits the rudder to move slowly into contact with stops 7, which releases the pressure from the liquid in cylinders 13 and 14 and permits the pump to build up pressures in cylinders 12 and 15 sufficiently to open the valve 26. As the valve 25 is being held open through contact of lug 31 with the head 32 on stem 28, all the cylinders are connected to the pump and are subjected to equal positive pressures which hydraulically locks the steering gear and prevents further movement of the rudder.

Figure 2:
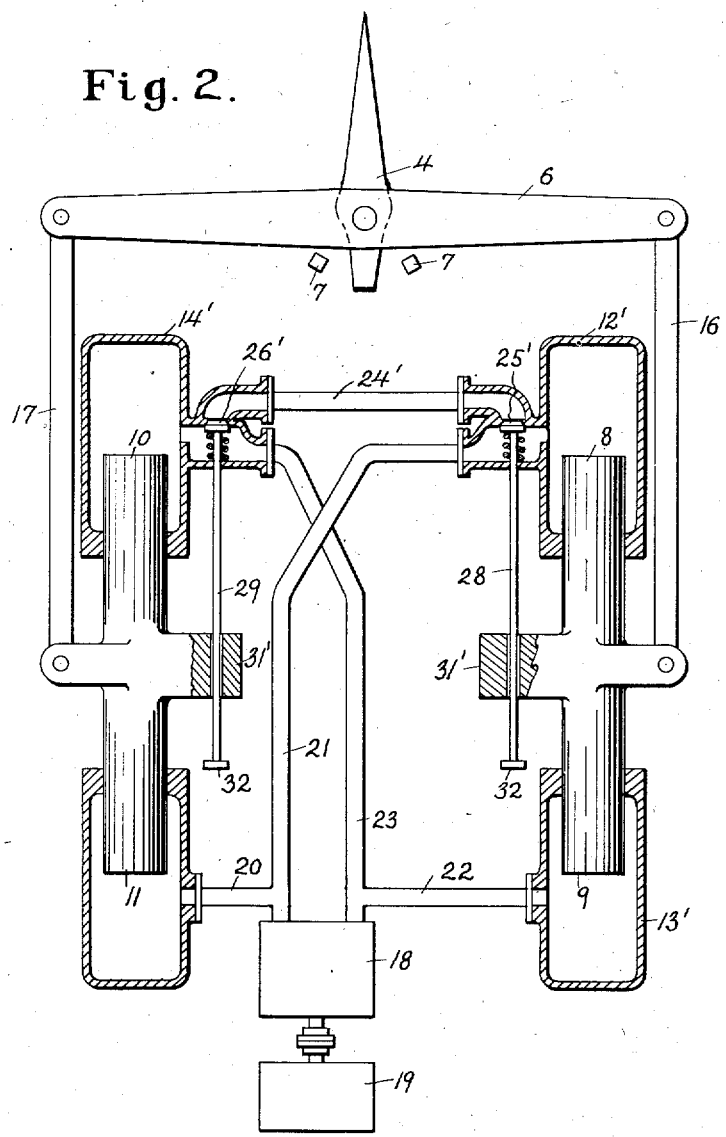
Fig. 2 is in general similar to Fig. 1, but the by-pass connects one cylinder of each of two pairs of cylinders.

The embodiment of my invention shown in Fig. 2 is very similar to that in Fig. 1 except that the cylinders 12′ and 14′ are connected together by a pipe 24 instead of connecting the cylinders 12′ and 13′ and each pair of rams carries a lug 31′ to actuate the valves 25′ and 26′. The operation is generally similar to that of Fig. 1 except that the pressure released from cylinder 12′ is transmitted to the suction cylinder 14′ of the other pair of rams instead of to the suction cylinder 13′ of the same pair of rams. The parts in Fig. 2 which are unchanged in their operation as compared with those in Fig. 1 and are similar thereto are given the same reference characters as in Fig. 1.

Figure 3:
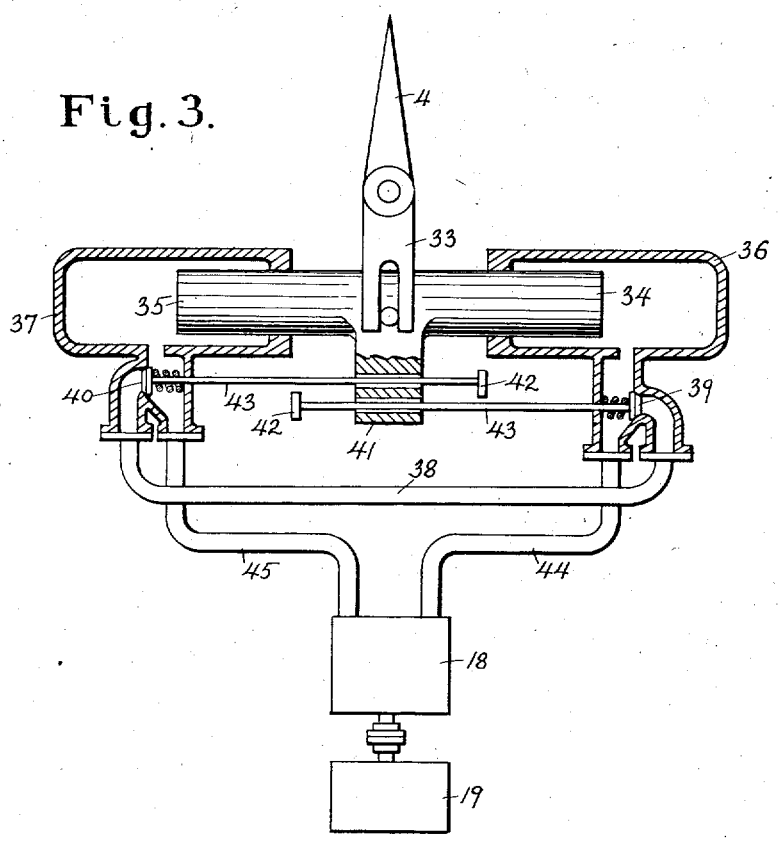
Fig. 3 shows my invention applied to a mechanism comprising but one pair of cylinders.

In Fig. 3 the rudder 4 is connected by means of a crosshead 33 to rams 34 and 35 in cylinders 36 and 37. These cylinders are connected together by a pipe 38 controlled by valves 39 and 40 which are adapted to be opened by contact of lug 41 with the heads 42 on valve stems 43. The liquid under pressure is transmitted from pump 18 through pipes 44 and 45 to the cylinders 36 and 37, respectively. The operation of this form of my invention is believed to be sufficiently clear from the description of Fig. 1 since it is in all respects the same as Fig. 1 except that but one pair of cylinders is used instead of two pairs.

It will be understood that the above description and accompanying drawings comprehend only the general and preferred embodiment of my invention and that various changes may be made therein within the scope of the appended claims without sacrificing any of the advantages of this invention.

The invention described herein may be manufactured and used by or for the Government of the United States of America for governmental purposes without the payment of any royalty thereon.

I claim:

1. In combination, a rudder post, a crosshead connected thereto, four cylinders arranged in pairs, said pairs being parallel and the cylinders in each pair being aligned, rams connected in pairs and disposed to be operable in said cylinders, means connecting said rams to the crosshead, a pump to supply liquid under pressure, means connecting said cylinders to the pump to apply pressure in one cylinder of each pair and suction in the other cylinder of each pair, the connections being such that the forces exerted on said crosshead due to the said positive pressure are additive, a pipe connecting one cylinder of one pair to the other cylinder of the same pair, a lug carried by the rams operating in the cylinders of the last mentioned pair, a valve adapted to close each end of said pipe and disposed to be moved to closed position by pressure in the adjacent cylinder, a loading spring acting on each valve, a stem connected to each valve and passing through an aperture in said lug and means on each stem adapted to be contacted by said lug to unseat one of said valves substantially at the end of movement of the ram in a direction away from such valve.

2. In combination, a rudder post, four cylinders arranged in pairs, said pairs being parallel and the cylinders in each pair being aligned, rams connected in pairs and disposed to be operable in said cylinders, means connecting said rams to the post, a pump to supply liquid under pressure, means connecting said cylinders to the pump to apply pressure in one cylinder of each pair and suction in the other cylinder of each pair, the connections being such that the forces exerted on said crosshead due to said pressures are additive, a pipe connecting one cylinder of one pair to the other cylinder of the same pair, a lug carried by the rams operating in the cylinders of the last mentioned pair, a valve adapted to close each end of said pipe and disposed to be moved to closed position by pressure in the adjacent cylinder, a loading spring acting on each valve, a stem connected to each valve and passed through an aperture in said lug and means on each stem adapted to be contacted by said lug to unseat the valve substantially at the end of movement of the ram in a direction away from the respective valve.

3. In combination, a rudder post, four cylinders arranged in pairs, said pairs being parallel and the cylinders in each pair being aligned, rams operable in said cylinders, means connecting said rams to said post, a pump to supply liquid under pressure, means connecting said cylinders to the pump to apply pressure in one cylinder of each pair and suction in the other cylinder of each pair, said connection being such that the forces exerted on said post are additive, a pipe connecting the pressure cylinder of one pair to the suction cylinder of the other pair, a valve disposed to close each end of said pipe, a loading spring acting upon each valve, an apertured lug carried by each pair of said rams, a stem connected to each valve and extending through an aperture in the adjacent lug and a member on each of said stems adapted to be contacted by the respective lug to open the valve substantially at the end of movement of the rams away from the valve.

4. In combination, a rudder post, a pair of opposed aligned cylinders, connected rams operable in said cylinders, means simultaneously to apply pressure to one cylinder and suction to the other cylinder, a pipe adapted to connect said cylinders directly, a valve disposed to close each end of said pipe and adapted to be seated by pressure in the adjacent cylinder, a loading spring acting upon each valve, an apertured lug carried by said ram, a stem connected to each valve and extending through an aperture in said lug, means on each stem to be contacted by said lug to unseat a valve substantially at the end of movement of the ram away from such valve and means operatively connecting said rams to said post.

5. In combination, a plurality of pairs of cylinders, the cylinders in each pair being opposed and aligned, a ram operable in each cylinder, the rams in each pair of cylinders being connected, a pump connected to apply simultaneously pressure to one cylinder of each pair and suction to the other cylinder of each pair, a pipe connecting one positive pressure cylinder to a suction cylinder, a valve disposed to close each end of said pipe and means operable by a ram substantially at the limit of its movement away from a valve to open the valve adjacent said pressure cylinder.

6. In combination, rudder post, a pair of cylinders, connected rams operable in said cylinders, means simultaneously to apply pressure to one cylinder and suction to the other, a pipe adapted to connect said cylinders directly, a valve disposed to close each end of said pipe and adapted to be seated by pressure in the adjacent cylinder, an apertured lug carried by said ram, a stem connected to each valve and extending through an aperture in said lug, means on each stem to be contacted by said lug to unseat the valve substantially at the end of movement away from such valve and means operatively connecting said rams to said post.

7. In combination, a plurality of pairs of cylinders, a ram operable in each cylinder, the rams in each pair of cylinders being connected, a pump connected to apply simultaneously pressure to one cylinder of each pair and suction to the other cylinder of each pair, a pipe connecting one positive pressure cylinder to a suction cylinder, a valve disposed to close each end of said pipe and means operable by said ram substantially at the end of its movement away from the valve to open the valve adjacent a pressure cylinder.

8. In combination, a rudder post, a pair of cylinders, a ram operable in each cylinder, means to apply simultaneously pressure to one cylinder and suction to the other, a pipe connecting said cylinders, a valve disposed to close each end of said pipe adapted to be moved toward its seat by pressure in the adjacent cylinder but to be unseated by pressure in said pipe, a stem connected to and extending from each valve, means to act upon said stem to unseat the valve adjacent the pressure cylinder when the ram in the pressure cylinder is near the limit of its outward movement and means operably connecting said means to said post.

9. In a device of the class described, a plurality of pairs of cylinders, a ram operable in each cylinder, the rams in each pair of cylinders being connected, a pump connected to apply pressure to one cylinder of each pair and suction to the other cylinder of each pair, a pipe connecting the cylinders of one pair, a valve disposed to close each end of said pipe and adapted to be moved against its seat by pressure in the adjacent cylinder but to be unseated by pressure in said pipe and means actuatable to unseat the valve adjacent the cylinder in which the pressure is acting when the ram therein is near the limit of its outward movement therefrom.

10. In a device of the class described, a pair of cylinders, a ram operable in each cylinder, said rams being connected together, means to apply pressure to one cylinder and suction to the other cylinder, a pipe connecting said cylinders, a valve disposed to close each end of said pipe and adapted to be moved against its seat by pressure in the adjacent cylinder but to be unseated by pressure in said pipe and means actuatable to unseat the valve adjacent the cylinder in which the pressure is acting when the ram therein is near the limit of its outward movement.

11. In a device of the class described, a rudder post, a plurality of cylinders, a ram operable in each cylinder, means to apply pressure to certain of said cylinders and suction to the others thereof, means connecting all of said rams to said post in such manner that the forces exerted thereon by all the rams subjected to pressure at any given time are additive, means connecting each pressure cylinder with a suction cylinder, said last mentioned means being adapted to transmit pressure between said cylinders, a valve disposed to close each end of said means and adapted to be seated by pressure in the cylinder adjacent thereto and means operable by movement of the ram in such adjacent cylinder away from the respective valve to unseat such valve as such ram approaches the limit of the said movement.

12. In a device of the class described, a movable member, a plurality of cylinders, a ram operable in each cylinder, means to apply pressure to certain of said cylinders and suction to the others thereof, means connecting all of said rams to said member in such manner that the forces exerted thereon by all the rams subjected to pressure at any time are additive, means connecting each pressure cylinder with a suction cylinder, said last mentioned means being adapted to transmit pressure between said cylinders, a valve disposed to close each end of said means and adapted to be seated by pressure in the cylinder adjacent thereto and means operable by movement of the ram in such adjacent cylinder away from the respective valve to unseat such valve.

13. The combination with a rudder, of a pair of cylinders, a ram having an end respectively operative in each of said cylinders, a pump connected to said cylinders selectively to supply liquid under pressure to one of said cylinders and simultaneously withdraw liquid from the other cylinders, other means connecting said cylinders to transfer fluid directly from one to the other thereof, valves controlling said other means normally to prevent flow of liquid through said other means from the cylinder to which liquid is being supplied by said pump, each of said valves being unseatable by pressure within said other means, means to open the said valve controlling flow of liquid away from the cylinder to which liquid is being supplied by the pump substantially at the limit of outward movement of said ram in the cylinder to which liquid is being supplied, and stops to arrest the swing of said rudder under pressure of water when moving astern, whereby said pump builds up pressure in said other means to open the said valve controlling the flow of liquid through the said other means away from the cylinder from which the pump is withdrawing liquid.

14. The combination with hydraulic power mechanism, of a member connected thereto to be drivable thereby, said member being at times subject to an external force acting on said member in the same direction as is the driving effort of said mechanism at that time, means to interconnect parts of said mechanism to neutralize the driving effect of said mechanism, separate means to control the functioning of said interconnecting means from each direction of driving action of said mechanism, said control means being operable by pressure within said interconnecting means, means operatively associated with said member to actuate substantially at the limit of movement of said member that control means which will neutralize the driving effect of said mechanism in that direction, and means to arrest the movement of said member substantially at the time of actuation of said control means, whereby said mechanism is relieved of the load imposed thereon by said force and pressure will be built up in said interconnecting means to overcome the pressure in said mechanism due to the action of said force on the control means other than the one actuated as aforesaid, to actuate by said built up pressure the said other control means and thereby complete said neutralizing interconnection.

15. The combination with hydraulic power mechanism that includes devices to apply the power of said mechanism selectively in opposite directions, of a member movable in opposite directions connected to said devices to be moved thereby, said member being at times subjected to an external force acting on said member in the same direction as is the power of said mechanism at that time, means to interconnect said devices to equalize the pressures therein, valves to control the movement of liquid through said interconnecting means, all of said valves being unseatable by pressure within said interconnecting means but being held on their respective seats by pressure acting from one of said devices toward said interconnecting means, means operatively associated with said member to unseat substantially at the limit of movement of said member that valve which is being held seated by operating pressure in one of said devices, and means to arrest the movement of said member by said force, whereby pressure is built up in said interconnecting means to unseat another valve and complete the equalizing interconnection between said devices.

16. The combination with hydraulic power mechanism that includes devices to apply the power of said mechanism selectively in opposite directions, of a member movable in opposite directions connected to said devices to be moved thereby, said member being at times subject to a force that so moves said member that pressure in the non-driving device is built up and the pressure in the driving device is diminished, means to interconnect said devices to equalize the pressures therein, valves to control the movement of liquid through said interconnecting means, all of said valves being unseatable by pressure in said interconnecting means but being held on their respective seats by pressure acting from said devices toward said interconnecting means, means operatively associated with said member to unseat substantially at the limit of movement of said member that valve being held seated by pressure in the driving device and means to arrest movement of said member by said force, whereby pressure is built up in said interconnecting means to unseat the valve that is held seated by the pressure built up by said force as aforesaid and thereby complete the equalizing interconnection between said devices.

17. In combination, a rudder, a rudder post, a pair of cylinders, a ram operative in each cylinder, stops to limit the angular movement of said rudder and rudder post, a pump to apply simultaneously fluid to one cylinder and withdraw fluid from the other cylinder, said rudder being movable by said pump or by action of water pressure directly on said rudder, other means connecting said cylinders to transfer fluid directly from one to the other thereof, valves controlling said other means normally to prevent flow of fluid through said other means, each of said valves being unseatable by fluid pressure within said other means and by mechanical means substantially at the limit of movement of said ram, whereby when the vessel is moving ahead, the mechanical means unseats one of said valves and fluid pressure unseats the other valve before rudder is arrested by said stops, and when the vessel is moving astern the mechanical means unseats one of said valves, rudder is arrested by said stops permitting the fluid pressure from said pump to rise sufficiently to unseat the other of said valves.

RALPH ERLING.